(12) United States Patent
Bennett

(10) Patent No.: US 10,954,994 B2
(45) Date of Patent: Mar. 23, 2021

(54) AIRCRAFT ASSEMBLY

(71) Applicant: SAFRAN LANDING SYSTEMS UK LTD, Gloucester (GB)

(72) Inventor: Ian Robert Bennett, Cheltenham (GB)

(73) Assignee: Safran Landing Systems UK LTD

( * ) Notice: Subject to any disclaimer, the term of this patent is extended or adjusted under 35 U.S.C. 154(b) by 874 days.

(21) Appl. No.: 15/044,386

(22) Filed: Feb. 16, 2016

(65) Prior Publication Data

US 2016/0238062 A1  Aug. 18, 2016

(30) Foreign Application Priority Data

Feb. 18, 2015  (EP) .................................. 15155656

(51) Int. Cl.
| | |
|---|---|
| *F16C 33/74* | (2006.01) |
| *F16C 11/04* | (2006.01) |
| *F16C 17/02* | (2006.01) |
| *F16C 35/02* | (2006.01) |
| *F16C 33/12* | (2006.01) |
| *F16C 33/08* | (2006.01) |
| *F16B 4/00* | (2006.01) |
| *B64C 25/34* | (2006.01) |

(52) U.S. Cl.
CPC .............. *F16C 11/04* (2013.01); *F16C 17/02* (2013.01); *F16C 33/08* (2013.01); *F16C 33/12* (2013.01); *F16C 33/74* (2013.01); *F16C 35/02* (2013.01); *B64C 25/34* (2013.01); *F16B 4/004* (2013.01)

(58) Field of Classification Search
CPC .......... F16C 17/02; F16C 33/72; F16C 33/74; Y10T 403/32861; Y10T 403/32868; Y10T 403/32918; Y10T 403/32926; Y10T 403/32975; Y10T 403/32983; Y10T 403/32606; Y10T 403/32951; Y10T 403/32959; Y10T 403/32967
See application file for complete search history.

(56) References Cited

U.S. PATENT DOCUMENTS

| | | | | |
|---|---|---|---|---|
| 5,895,317 | A | * | 4/1999 | Timm ...................... B24D 5/12 451/359 |
| 9,382,933 | B2 | * | 7/2016 | Sottiaux ..................... C09J 5/00 |
| 2006/0174485 | A1 | | 8/2006 | Shore |
| 2008/0163453 | A1 | | 7/2008 | Joseph |
| 2012/0324707 | A1 | * | 12/2012 | Williams ............ F16C 11/0614 29/525.01 |
| 2013/0181436 | A1 | | 7/2013 | McPherson |
| 2014/0203145 | A1 | * | 7/2014 | Blanton .................... B64C 1/00 244/131 |
| 2014/0373359 | A1 | | 12/2014 | Schomaker |

FOREIGN PATENT DOCUMENTS

| | | | | |
|---|---|---|---|---|
| DE | 102 41 801 | * | 3/2004 | ............. E21D 15/44 |
| GB | 134272 | | 10/1919 | |
| GB | 1210728 | | 10/1970 | |
| JP | 2011198638 | | 10/2011 | |
| WO | 2013164580 | | 11/2013 | |

OTHER PUBLICATIONS

Extended European Search Report dated Aug. 6, 2015 for European Application No. 15155656.0-1760.

* cited by examiner

*Primary Examiner* — Michael P Ferguson
(74) *Attorney, Agent, or Firm* — RatnerPrestia

(57) ABSTRACT

An aircraft assembly having a bush mounted within a lug and a recess which extends along a portion of the lug-bush interface to create a relatively wide cavity for receiving sealant.

14 Claims, 5 Drawing Sheets

AIRCRAFT ASSEMBLY

This application claims the benefit of and priority to European Application No. EP15155656.0, filed Feb. 18, 2015, which is incorporated herein by reference in its entirety.

BACKGROUND

An aircraft assembly can include a bush fitted within a lug to provide a static or dynamic bearing. The bush defines a bearing face for supporting a shaft or the like.

The bush can be fitted to the lug by way of an interference fit, or can be mechanically fixed by a bolt or the like. Thus, a narrow space exists between adjacent faces of the lug and bush, which will be referred to as the lug-bush interface.

It is common for the lug to be formed from a corrodible material. As such, sealant is generally applied at the open ends of the lug-bush interface in order to create a barrier inhibiting moisture ingress into the lug-bush interface.

The present inventor has identified that known moisture barriers can be improved.

SUMMARY

Embodiments of the invention can relate to an aircraft assembly having a bush mounted within a lug, and a recess which extends along a portion of the lug-bush interface to create a relatively wide cavity at an end of the lug-bush interface for receiving sealant.

According to a first aspect of the invention, there is provided an aircraft assembly comprising a bush mounted within a lug, the lug and bush together defining a lug-bush interface between adjacent faces of the lug and bush, and a recess defined by a generally annular groove formed into one or both of the lug and the bush, the recess extending from a first end of the lug-bush interface into and along a portion of the lug-bush interface to define a cantilevered end portion of the bush such that sealant may be applied in the recess between the cantilevered portion of the bush and the lug to provide a moisture tight seal between the lug and bush.

Thus, the recess enables a degree of relative axial movement to occur between the lug and bush without compromising the moisture tight seal. The recess causes the bead of sealant to be enclosed from three sides: below, behind and above, rather than just from below and behind as is the case in known arrangements. Thus, if a crack in the sealant propagates from a point of maximum strain, it is likely that the crack will reach the cantilevered portion of the bush rather than breach the sealant barrier. Should the crack extend predominately parallel to the end region of the lug-bush interface, it is likely that the length of the sealant bead will enable the sealant bead to stretch enough to relieve the induced stress such that the crack will not propagate sufficiently to breach the sealant barrier. The recess also provides an additional attachment face in comparison to a standard lug-bush configuration, thus improving overall sealant bead attachment strength.

The aircraft assembly can include a second recess defined by a generally annular groove formed into one or both of the lug and the bush, the second recess extending from a second end of the lug-bush interface into and along a portion of the lug-bush interface to define a second cantilevered end portion of the bush such that sealant may be applied in the recess between the cantilevered portion and the lug to provide a water tight seal between the lug and bush.

The bush can have a generally cylindrical body portion defining a bush bore, and a radial flange at one end of the body.

The first recess can extend from a region where a radial outer surface of the flange is adjacent to a side wall of the lug.

The second recess can extend from a region where an axial surface of the bush body is adjacent to a bore face of the lug.

The first cantilevered portion of the bush can include a chamfer or groove on the opposite side of the cantilevered portion with respect to the recess. The second cantilevered portion of the bush can include a chamfer or groove on the opposite side of the second cantilevered portion with respect to the second recess. The chamfer(s) or groove(s) serve to isolate the cantilevered end portion(s) of the bush from a loading object.

The internal edges/corners of any recess can be arcuate or radiused to limit stress raiser effects.

The or each recess can be partially or completely filled with sealant.

According to a second aspect of the invention there is provided an aircraft strut, brace, stay or actuator joint which includes the aircraft assembly according to the first aspect.

According to a third aspect of the invention there is provided an aircraft landing gear assembly including an aircraft assembly according to the first aspect or an aircraft strut, brace, stay or actuator joint according to the second aspect.

BRIEF DESCRIPTION OF THE DRAWINGS

Embodiments of the invention will now be described with reference to the accompanying drawings, in which.

DETAILED DESCRIPTION

Figure 1:
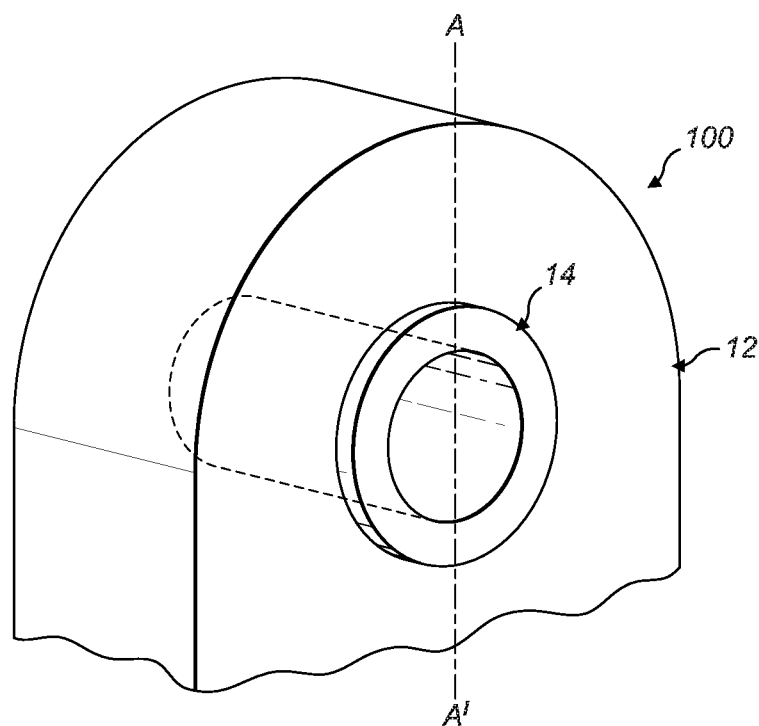
FIG. 1 is a perspective diagram of a prior art aircraft assembly.

FIG. 1 shows a prior art aircraft assembly 100. The assembly includes a lug 12 fitted with a bush 14. The assembly can form part of a bearing assembly in which a shaft or the like (not shown) is statically or dynamically mounted within the bore defined by the bush 14.

Figure 2A:
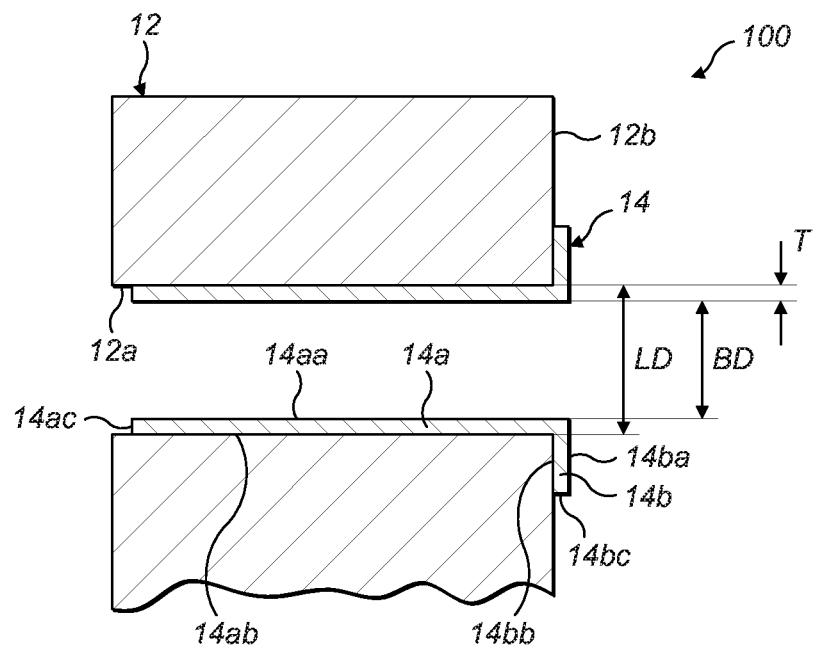
FIG. 2a is a diagram of the aircraft assembly of FIG. 1 in cross section.

FIG. 2 shows the aircraft assembly 100 of FIG. 1 in cross section through A-A'. The lug 12 includes a generally cylindrical inner face 12a which defines a lug bore having a bore diameter LD.

The bush 14 comprises a generally cylindrical body 14a arranged to be fitted within the lug bore, and a radial flange 14b. When the body 14a is fully inserted into the bore, the flange 14b is adjacent to a side face 12b of the lug 12. The bush 14 can be coupled to lug 12 by way of an interference fit, but in other cases can be coupled by any suitable means such as a bolt.

The bush body 14a includes an inner face 14aa and an outer face 14ab which extend in a generally parallel relationship. An axial end face 14ac connects the inner and outer faces 14aa, 14ab. The inner face 14aa defines a bore having a diameter BD. The bush bore is arranged to receive a shaft or the like.

Figure 2B:
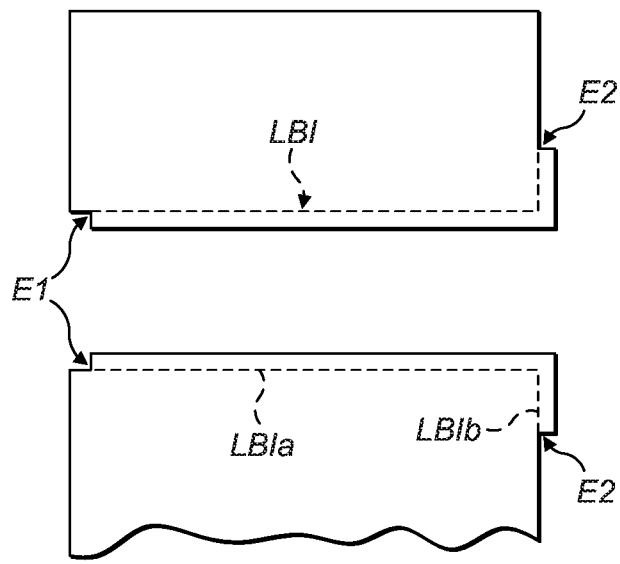
FIG. 2b is diagram of the aircraft assembly of FIG. 1 in identifying the lug-bush interface.

Referring additionally to FIG. 2b, the space between adjacent faces of the lug 12 and bush 14 defines a lug-bush interface LBI which in this case is has a generally cylindrical component LBIa along the lug bore and a generally radial component LBIb where the bush flange 14b meets the side face 12b of the lug 12. The lug-bush interface LBI can be considered to have a first end E1, within the bore, and a second end E2 at the peripheral face of the flange.

Although the lug 12 and bush 14 can be in contact along the lug-bush interface LBI, a space will nevertheless generally always exist. As such, it is possible for moisture to enter the lug-bush interface LBI. Moisture ingress into the lug-bush interface LBI can lead to corrosion of the lug 12 due to ion migration between the lug 12 and bush 14. Such corrosion can be particularly problematic because the lug-bush interface LBI is often difficult to inspect.

Figure 3:
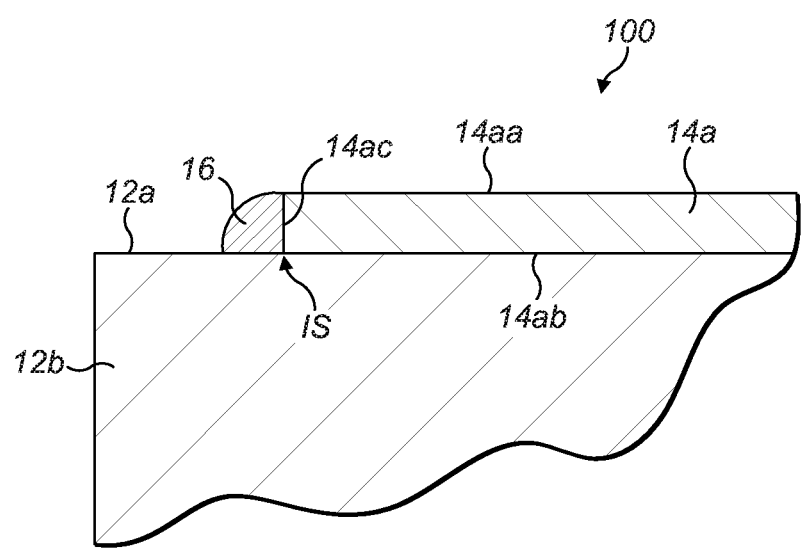
FIG. 3 is a diagram of the aircraft assembly of FIG. 1 focused on the lug-bush interface.

Referring additionally to FIG. 3, it is known to provide a bead of sealant 16 coupled to the outer faces of the lug 12 and bush 14 at the ends E1, E2 of the lug-bush interface LBI in order to create a barrier arranged to inhibit moisture ingress into the lug-bush interface LBI. Typical sealant materials are polysulphide, polythioether or silicone.

However, under loading, the lug 12 can deform and if the deformation exceeds the interference fit of the bush 14 then a gap can open at one side of the joint and relative movement can occur between the lug 12 and bush 14. The bead of sealant 16 will then experience infinite strain at the boundary point IS since the bead of sealant 16 has zero length at the very corner. Since the bead of sealant 16 is not able to stretch sufficiently to account for the relative movement, the bead 16 must either crack or detach from one of the faces to which it is attached, thereby compromising the moisture barrier.

Figure 4:
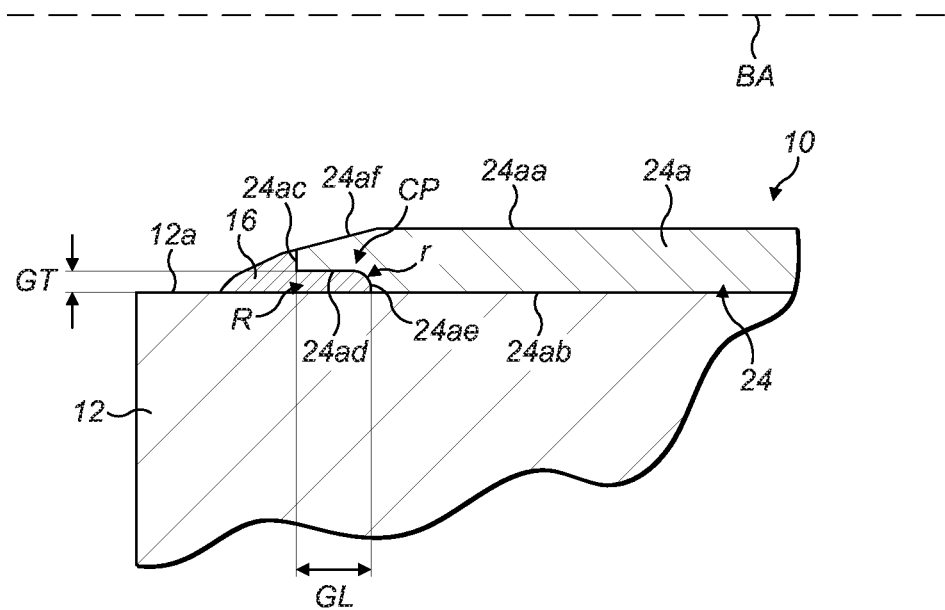
FIG. 4 is a diagram of an aircraft assembly according to an embodiment of the invention in a normal condition.

FIG. 4 shows an aircraft assembly 10 according to an embodiment of the invention. The aircraft assembly 10 is similar to that described with reference to FIGS. 1 to 3 and for brevity the following description will focus on the differences. Like parts are given the same reference symbols.

As an overview, an aircraft assembly according to an embodiment of the invention includes a recess which serves to enlarge an end portion of the lug-bush interface LBI to receive sealant. The recess R is formed by a generally annular groove formed into one or both of the lug and bush. The recess R is arranged to define a space which, when the bush 24 is fitted in the lug bore, is enclosed on three sides (below, above and behind) to reduce the likelihood of relative movement between the bush 24 and lug 12 allowing moisture ingress into the lug-bush interface LBI.

The recess R can be provided at the first end of the lug-bush interface LBI, within the lug bore, and/or at the second end of the lug-bush interface LBI, where the bush flange meets the outer face of the lug. In some embodiments it is envisaged that the bush may not include a flange, in which case the second end of the lug-bush interface LBI may also be within the lug bore.

In the illustrated embodiment the recess R is defined by a single generally annular groove formed into the outer face 24ab of the bush and has a cover face 24ad which extends from the axial face 24ac into the bush body 24a generally parallel to the bush axis BA. The cover face 24ad terminates in a rear face 24ae which extends outwardly relative to the bush axis BA to meet the end of the outer face 24ab of the bush body 24a. In the illustrated embodiment the connection between the cover face 24ad and the back face 24ae is arcuate with a radius r to reduce stress raiser effects within the bush 24; however, in other embodiments the connection can be a perpendicular corner for ease of machining.

It will be appreciated that if the bush body and lug bore are not cylindrical then the generally annular recess will take a corresponding shape; for example, if the lug bore and bush body have a generally rectangular cross section, the generally annular recess can have a corresponding generally rectangular cross section.

Due to the recess R, the end portion CP of the bush body 24a is cantilevered. As such, the inner face 24aa of the bush 24 includes a region of reduced thickness 24af adjacent the axial face 24ac and extending along a portion of the bush body 24a such that load is not applied to the cantilevered portion CP of the bush by a loading object such as a rod or pin (not shown) mounted within the bush bore. In the illustrated embodiment the region of reduced thickness is defined by an inwardly tapered section 24af extending towards the axial face 24ac. However, in other embodiments the region of reduced thickness can comprise a shoulder portion which is similar to the recess R but formed into the inner face 24aa, or in some cases it can be omitted.

The length GL of the recess can be between 0.5 and 5 mm and preferably between 1 and 3 mm. The length may depend on a number of factors such as the size of the bush, the bush material and the intended shaft loading.

The thickness GT of the recess can be between 10 and 75% of the installed thickness of the bush, and preferably between 25% and 60%. It is preferred that the recess thickness is at least machining allowance deeper to allow for tolerance machining of the underside of the flange, which may occur prior to installation. Similar considerations apply where a groove or chamfer is provided in the inner face 24aa of the body 24a, or the outer face of the flange, to isolate the cantilevered portion CP from loading by a shaft or the like.

Figure 5A:
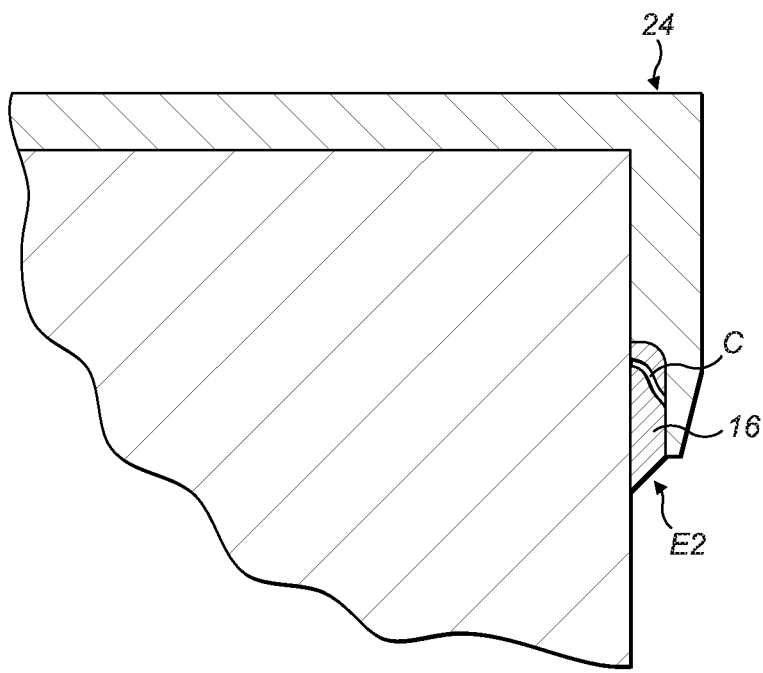
FIG. 5a is a diagram of an aircraft assembly of FIG. 4 following relative axial movement between the lug and bush causing sealant at the body end of the bush to crack.
Figure 5B:
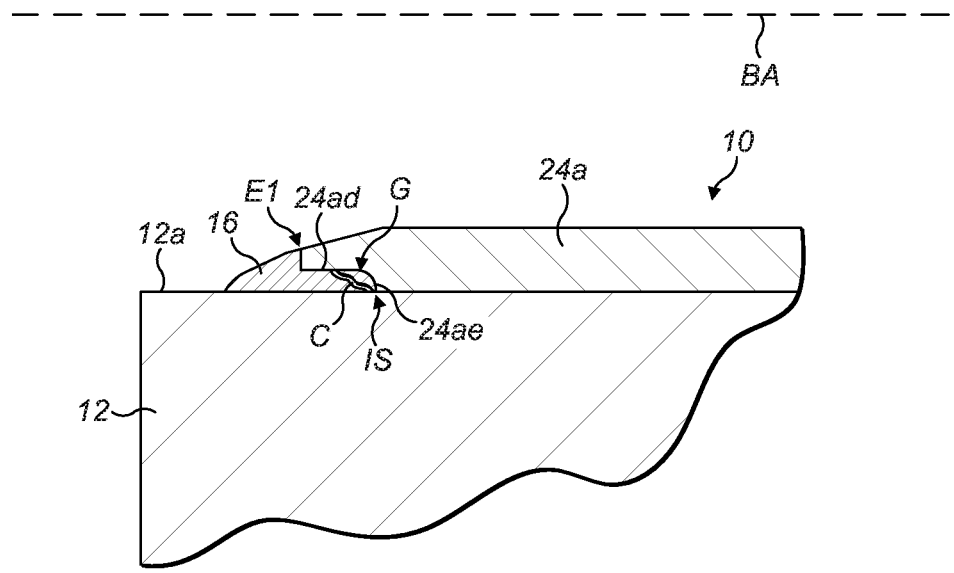
FIG. 5b is a diagram of an aircraft assembly of FIG. 4 following relative axial movement between the lug and bush causing the sealant at the flange end of the bush to crack.

FIG. 5a shows a situation in which the bush 24 has moved relative to the lug 12 by an amount which is sufficient to cause a crack C to form in the bead of sealant 16 at the body end E1 of the lug-bush interface LBI. However, the recess R enables a degree of relative axial movement to occur between the lug 12 and bush 24 without compromising the moisture-tight seal. In embodiments where a recess is provided at the flange end E2 of the lug-bush interface, as depicted in FIG. 5b, the recess enables a degree of radial movement to occur between the lug 12 and bush 24 without compromising the moisture-tight seal.

The recess R causes the bead of sealant 16 to be enclosed from three sides 12a, 24ae, 24ad, rather than just two as in known arrangements; thus, if a crack C in the sealant propagates from the point of maximum strain IS, where the axial face of the bush 24ae is closest to the bore face 12a of the lug 12, it is likely that the crack C will reach the opposing bush face 24ad rather than breach the sealant barrier 16. Should the crack C extend predominately parallel to the bush axis BA, it is likely that the length of the sealant bead 16 will enable the sealant bead 16 to stretch enough to relieve the induced stress such that the crack C will not propagate sufficiently to breach the sealant barrier. The recess R also provides an additional attachment face 24*ad* in comparison to a standard lug-bush configuration, thus improving overall sealant bead attachment strength.

Figure 6:
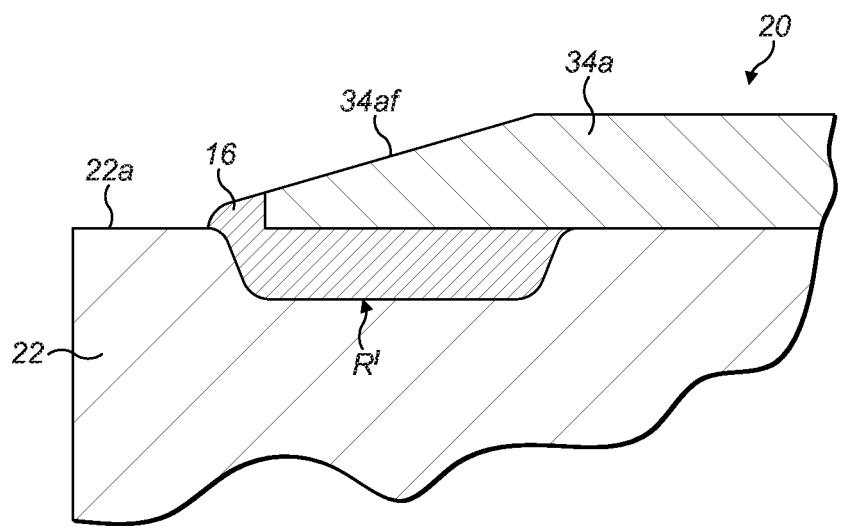
FIG. 6 is a diagram of an aircraft assembly according to a further embodiment of the invention in a normal condition.

FIG. 6 shows an aircraft assembly 20 according to a further embodiment in which the recess R' is defined by a generally annular groove formed into the bore face 22*a* of the lug 22, rather than into the bush body 34*a*. As with the previous embodiment, the bush body 34*a* includes a chamfer 34*af* to isolate the cantilevered portion of the bush body 34*a* from loads applied by a shaft or the like mounted within the bush bore.

Likewise, in embodiments where a recess is provided at the flange end of the lug-bush interface, the recess can be formed into the outer face of the lug 22.

Figure 7:
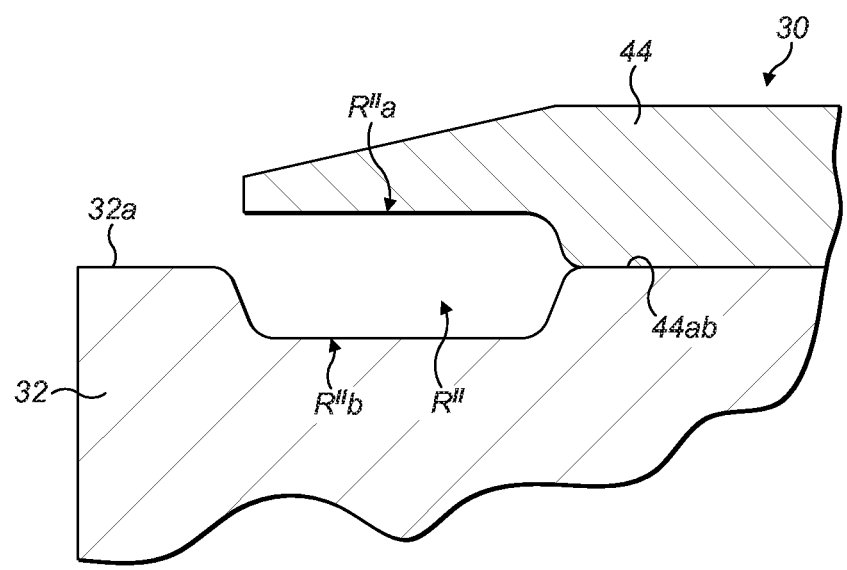
FIG. 7 is a diagram of an aircraft assembly according to a further embodiment of the invention in a normal condition.

FIG. 7 shows an aircraft assembly 30 according to a further embodiment in which the recess R" is formed by two aligned generally annular grooves, one R"*a* formed into the outer face 44*ab* of the bush 44 and the other R"*b* formed into the bore face 32*a* of the lug 32.

Likewise, in embodiments where a recess is provided at the flange end of the lug-bush interface, the recess can be formed by two aligned component grooves, one formed into the underside of the bush flange and the other formed into the side face of the lug.

The potential modifications described with reference to FIGS. 4 to 5*b* apply equally to the embodiments of FIGS. 6 and 7.

Figure 8:
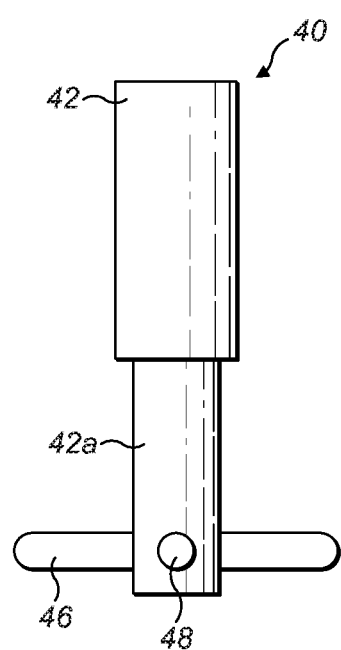
FIG. 8 is a diagram of an aircraft landing gear assembly according to an embodiment of the invention.

FIG. 8 is a diagram of an aircraft landing gear assembly 40 according to an embodiment of the invention. The aircraft landing gear assembly 40 includes a main fitting 42 arranged to be coupled to an aircraft (not shown). A bogie beam 46 or other suitable wheel assembly is coupled to a slider 42*a* via a pin joint 48. The slider 42*a* defines a lug containing a bush as described above with reference to one of FIGS. 4 to 7.

The lug according to embodiments of the invention can be formed from a metal such as aluminium alloy, steel or titanium alloy.

The bush according to embodiments of the invention can be formed from aluminium bronze, aluminium-nickel-bronze, bronze, or other copper alloys, or 'white metal' families of alloys.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. An aircraft assembly comprising:
a lug comprising a side wall and a lug bore extending therethrough;
a bush mounted within the lug, comprising:
a generally cylindrical body portion secured within the lug bore and having a bush bore extending therethrough defining a bearing face configured to rotatably support a shaft; and
a radial flange extending outwardly from one end of the cylindrical body portion and secured against the lug side wall;
a first lug-bush interface defined between adjacent faces of the lug side wall and the radial flange, comprising a first recess defined by a generally annular groove formed into one or both of the lug and the bush, the first recess extending from a first end of the lug-bush interface where a radial outer surface of the flange is adjacent to the lug side wall into and along a portion of the lug-bush interface to define a first cantilevered end portion of the bush at the flange such that sealant may be applied in the first recess between the cantilevered portion and the lug to provide a moisture tight seal between the lug and bush; and
a second lug-bush interface defined between adjacent faces of the lug bore and the cylindrical body portion, comprising a second recess defined by a generally annular groove formed into one or both of the lug and the bush, the second recess extending from a first end of the lug-bush interface wherein an axial outer surface of the cylindrical body portion is adjacent to the lug bore into and along a portion of the lug-bush interface to define a second cantilevered end portion of the bush at the cylindrical body portion such that sealant may be applied in the second recess between the cantilevered portion and the lug to provide a moisture tight seal between the lug and bush.

2. An aircraft assembly according to claim 1, wherein the first cantilevered portion of the bush includes a chamfer or groove on the opposite side of the cantilevered portion with respect to the first recess.

3. An aircraft assembly according to claim 1, wherein the second cantilevered portion of the bush includes a chamfer or groove on the opposite side of the second cantilevered portion with respect to the second recess.

4. An aircraft assembly according to claim 1, wherein one or more internal edges and/or corners of the first recess defining the groove are arcuate.

5. An aircraft assembly according to claim 1, wherein the first recess is partially or completely filled with sealant.

6. An aircraft assembly according to claim 1, wherein the aircraft assembly is arranged to define at least part of an aircraft strut, brace, stay or actuator joint.

7. An aircraft assembly according to claim 1, wherein the bush is unitary in nature so as to be formed from a single piece of material.

8. An aircraft assembly according to claim 1, wherein the bush comprises:
the generally cylindrical body and radial flange being integrally formed with one another so as to be unitary in nature.

9. An aircraft assembly according to claim 1, wherein the body and flange are formed from the same material.

10. An aircraft assembly according to claim 1, wherein the assembly comprises sealant which extends over half way along the annular groove.

11. An aircraft assembly according to claim 1, wherein:
the generally annular groove of the first recess is formed into the bush but not the lug;
a first surface of the bush that faces the lug includes a step defined by the generally annular groove; and
a second surface of the lug that faces the first surface of the bush and is the same length as the first surface along the first lug-bush interface is straight such a first portion of the first surface at the first cantilevered end portion is relatively far from the second surface of the lug and a second portion of the of the first surface spaced from the cantilevered end portion along the first lug-bush interface is relatively close to the second surface of the lug.

12. An aircraft landing gear assembly including an aircraft assembly, the aircraft assembly comprising:
a lug comprising a side wall and a lug bore extending therethrough;
a bush mounted within the lug, comprising:
a generally cylindrical body portion secured within the lug bore and having a bush bore extending therethrough defining a bearing face rotatably supporting a shaft; and
a radial flange extending outwardly from one end of the cylindrical body portion and secured against the lug side wall;
a first lug-bush interface defined between adjacent faces of the lug side wall and the radial flange, comprising a first recess defined by a generally annular groove formed into one or both of the lug and the bush, the first recess extending from a first end of the lug-bush interface where a radial outer surface of the flange is adjacent to the lug side wall into and along a portion of the lug-bush interface to define a first cantilevered end portion of the bush at the flange such that sealant may be applied in the first recess between the cantilevered portion and the lug to provide a moisture tight seal between the lug and bush; and
a second lug-bush interface defined between adjacent faces of the lug bore and the cylindrical body portion, comprising a second recess defined by a generally annular groove formed into one or both of the lug and the bush, the second recess extending from a first end of the lug-bush interface wherein an axial outer surface of the cylindrical body portion is adjacent to the lug bore into and along a portion of the lug-bush interface to define a second cantilevered end portion of the bush at the cylindrical body portion such that sealant may be applied in the second recess between the cantilevered portion and the lug to provide a moisture tight seal between the lug and bush.

13. An aircraft assembly comprising:
a lug comprising a side wall and a lug bore extending therethrough;
a bush mounted within the lug, comprising:
a generally cylindrical body portion secured within the lug bore and having a bush bore extending therethrough defining a bearing face configured to rotatably support a shaft; and
a radial flange extending outwardly from one end of the cylindrical body portion and secured against the lug side wall;
a first lug-bush interface defined between adjacent faces of the lug side wall and the radial flange, comprising a first recess defined by a generally annular groove formed into one or both of the lug and the bush, the first recess extending from a first end of the lug-bush interface where a radial outer surface of the flange is adjacent to the lug side wall into and along a portion of the lug-bush interface to define a first cantilevered end portion of the bush at the flange such that sealant may be applied in the first recess between the cantilevered portion and the lug to provide a moisture tight seal between the lug and bush, wherein the first recess is partially or completely filled with sealant; and
a second lug-bush interface defined between adjacent faces of the lug bore and the cylindrical body portion, comprising a second recess defined by a generally annular groove formed into one or both of the lug and the bush, the second recess extending from a first end of the lug-bush interface wherein an axial outer surface of the cylindrical body portion is adjacent to the lug bore into and along a portion of the lug-bush interface to define a second cantilevered end portion of the bush at the cylindrical body portion such that sealant may be applied in the second recess between the cantilevered portion and the lug to provide a moisture tight seal between the lug and bush.

14. An aircraft assembly comprising:
a lug comprising a lug side face and a lug bore extending through the lug side face;
a bush having a hollow cylindrical body and a radial flange extending radially from an end of the hollow cylindrical body and secured against the lug side face, the hollow cylindrical body having an outer face comprising a cylindrical outer wall secured in direct contact with the lug bore and an inner face defining a cylindrical bearing face configured to rotatably support a shaft;
a first lug-bush interface defined in a region in which the outer face of the cylindrical body faces the lug bore, comprising a first recess defined by a first generally annular groove formed into one or both of the lug and the bush, the first recess extending from a first end of the first lug-bush interface where an axial outer surface of the cylindrical body is adjacent to the lug bore into and along a portion of the first lug-bush interface to define a first cantilevered end portion of the bush at the cylindrical body such that sealant may be applied in the first recess between the cantilevered portion and the lug to provide a first moisture tight seal between the lug and the bush; and
a second lug-bush interface defined in a region in which a side of the radial flange faces the lug side face, comprising a second recess defined by a generally annular groove formed into one or both of the lug and the bush, the second recess extending from a first end of the lug-bush interface where a radial outer surface of the flange is adjacent to the lug side face into and along a portion of the lug-bush interface to define a second cantilevered end portion of the bush at the flange such that sealant may be applied in the second recess between the cantilevered portion and the lug to provide a second moisture tight seal between the lug and bush.

* * * * *